(No Model.)
C. E. VAN NORMAN.
KEY HOLDER.
No. 413,421.  Patented Oct. 22, 1889.
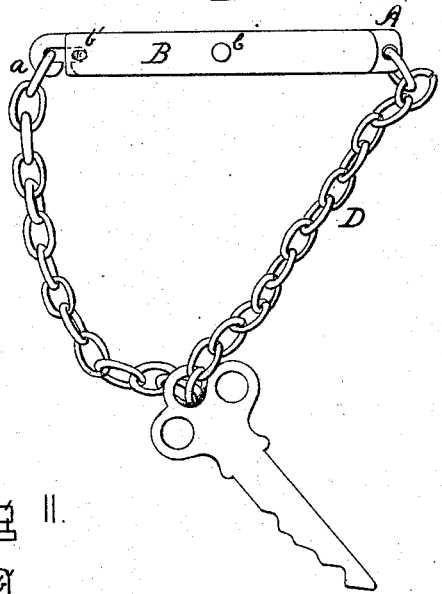
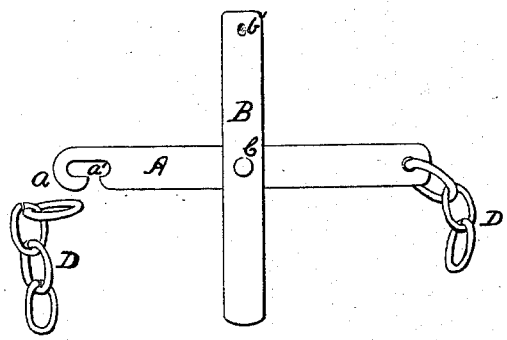
WITNESSES:
W. A. Caughey
Geo. H. Van Norman
INVENTOR
Chas E. Van Norman

UNITED STATES PATENT OFFICE.

CHARLES E. VAN NORMAN, OF WALTHAM, MASSACHUSETTS.

KEY-HOLDER.

SPECIFICATION forming part of Letters Patent No. 413,421, dated October 22, 1889.

Application filed June 3, 1889. Serial No. 313,021. (No model.)

*To all whom it may concern:*

Be it known that I, CHARLES E. VAN NORMAN, a citizen of the United States, residing at Waltham, in the county of Middlesex and State of Massachusetts, have invented a new and useful Improvement in Chain Key-Holders, of which the following is a specification.

My invention relates to improvements in chain key-holders, by use of which Yale lock-keys, or any other lock-keys, may be placed on a chain and securely fastened there, with freedom of passage of the keys over the fastener when it is locked, and when unlocked may present such safety-guard as will prevent the keys from dropping off the chain while its loosened end is held in the hand. I attain these objects by the mechanism illustrated in the accompanying drawings, in which—

Figure I is a plan view of my invention with a key in position on the chain, and the chain attached at each end to the fastener and locked there. Fig. II is a plan view of my invention, with a piece of the chain attached to one end of the fastener, a detached piece of the same near the other end and the locking-bar thrown crosswise, thus converting it into a guard-bar to prevent keys from dropping off the chain. Fig. III is an end view of the fastener with the locking-bar thrown crosswise, as in Fig. II.

Similar letters refer to similar parts throughout the several views.

A is a narrow link or bar, preferably of stamped metal, with an eye at one end suitable for receiving and holding permanently one end of a chain D, and with a hook $a'$ or its equivalent at the other end, suitable for readily attaching it to the free end of the chain D.

B is a narrow spring locking-bar pivoted or attached to the bar A by means of a pin C, and having a small boss or its equivalent at or near one end.

In detail the link or bar A may be of any suitable design that will possess the requisites of a suitable eye at one end for attaching the chain D permanently to it, a hook or catch at the other end, and suitable provision for attaching the locking-bar to it by means of the pin C, and the whole not so large in diameter as to prevent it being passed freely through the bow of small-sized keys. The locking-bar may be of spring-steel or other spring metal, of such form that when attached to the bar A and brought into longitudinal position with it the two ends of B will press snugly down on the bar A, and thus crowd the boss $b'$ into a suitable recess made for receiving it in the bar A, thus locking it in position and closing the entrance to the hook $a'$.

I am aware that previous to my present invention chain key-holders have been devised, and that patents on such have heretofore been allowed. I therefore do not claim, broadly, the use of a chain in constructing key-holders; but What I do claim as new, and desire to secure by Letters Patent, is—

1. In a key-holder device, the link or bar A, having in one end an eye to which the key-chain is attached, and having at its other end a hook or slot $a'$ for receiving the free end of the chain, combined with the locking-bar B, adapted to close the chain-receiving slot, and a chain D, permanently attached to one end of said bar B, substantially as and for the purpose set forth.

2. In a key-holder device, the link or bar A, having a chain D permanently attached to one of its ends, and having at its other end a device for receiving the other end of said chain, combined with the safety-bar B, arranged upon the bar A, so that the said bar B may be moved crosswise to the bar A, substantially as and for the purpose set forth.

3. In a key-holder device, the chain-bar A and chain D, attached to its ends, combined with the movable locking-bar B, connected to the said bar A and adapted to serve as a locking device for the chain D relative to the bar A, and as a means for preventing the keys from dropping off the chain while placing or removing the keys thereon, substantially as and for the purpose set forth.

CHARLES E. VAN NORMAN.

Witnesses:
JOHN L. HARVEY,
FRANK P. JOHNSON.